United States Patent
Goldman

(10) Patent No.: US 7,480,060 B2
(45) Date of Patent: Jan. 20, 2009

(54) INTERFEROMETRIC OPTICAL POSITION ENCODER EMPLOYING SPATIAL FILTERING OF DIFFRACTION ORDERS FOR IMPROVED ACCURACY

(75) Inventor: Andrew Goldman, Stow, MA (US)

(73) Assignee: GSI Group Corporation, Bedford, MA (US)

( * ) Notice: Subject to any disclaimer, the term of this patent is extended or adjusted under 35 U.S.C. 154(b) by 0 days.

(21) Appl. No.: 11/835,592

(22) Filed: Aug. 8, 2007

(65) Prior Publication Data
US 2008/0062431 A1 Mar. 13, 2008

Related U.S. Application Data

(60) Provisional application No. 60/843,209, filed on Sep. 8, 2006.

(51) Int. Cl.
G01D 5/36 (2006.01)
G01B 9/02 (2006.01)

(52) U.S. Cl. .................... 356/521; 250/237 G

(58) Field of Classification Search ........ 356/499, 356/521, 496, 498, 508, 509, 512; 250/231.14–231.18, 250/237 G
See application file for complete search history.

(56) References Cited

U.S. PATENT DOCUMENTS

| | | | |
|---|---|---|---|
| 5,249,032 A * | 9/1993 | Matsui et al. | 356/499 |
| 5,559,600 A | 9/1996 | Mitchell | |
| 5,646,730 A | 7/1997 | Mitchell et al. | |
| 5,680,211 A * | 10/1997 | Kaneda et al. | 356/499 |
| 7,027,163 B2 * | 4/2006 | Angeley | 356/521 |
| 7,046,342 B2 * | 5/2006 | Hinsberg et al. | 355/75 |
| 7,179,571 B2 * | 2/2007 | Hinsberg et al. | 430/22 |

* cited by examiner

Primary Examiner—Patrick J Connolly
Assistant Examiner—Scott M Richey
(74) Attorney, Agent, or Firm—BainwoodHuang

(57) ABSTRACT

An optical position encoder employs spatial filtering of diffraction orders other than +/− 1st diffraction orders for greater accuracy. The encoder includes a light source, a scale including a diffractive scale pattern, an optical detector adjacent to the scale, and first and second spaced-apart diffraction gratings between the light source and the scale. The gratings and scale are configured to spatially separate +/− 1st diffraction orders from other diffraction orders and to direct the +/− 1st diffraction orders along respective optical paths. The optical paths diverge from the first grating to respective locations on the second grating that are separated by more than the beam width of the source light beam. The optical paths further converge from the locations on the second grating to an area of the scale adjacent to the detector, and then extend from the area of the scale to the detector to create an interference pattern as a function of the relative position between the scale and the light source. Preferably, higher diffraction orders are separated by total internal reflection at the first diffraction grating.

18 Claims, 2 Drawing Sheets

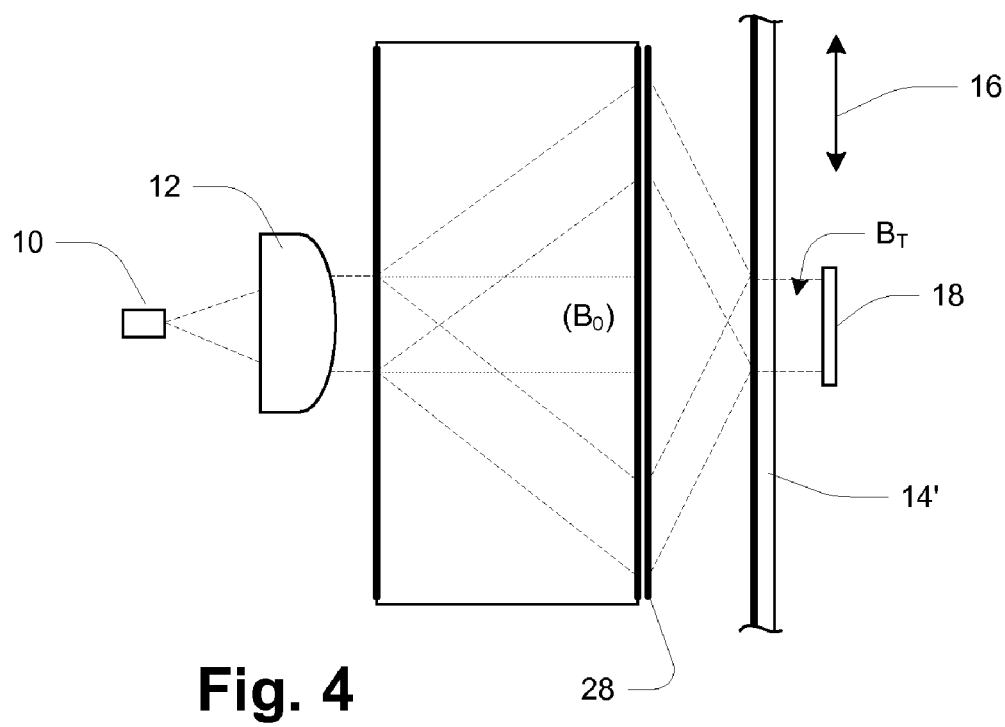
Fig. 4
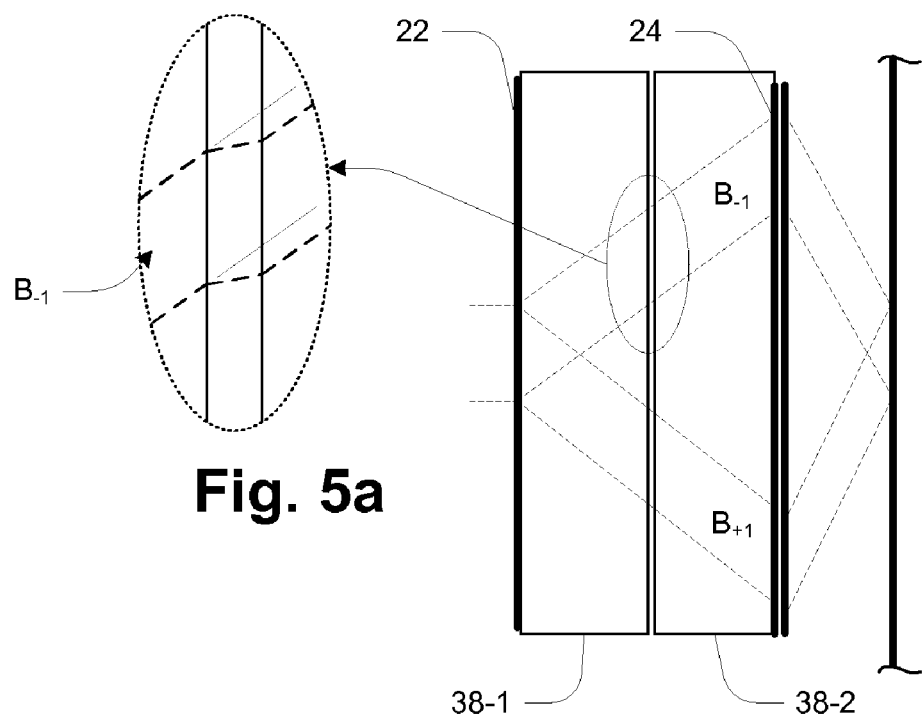
Fig. 5a
Fig. 5

INTERFEROMETRIC OPTICAL POSITION ENCODER EMPLOYING SPATIAL FILTERING OF DIFFRACTION ORDERS FOR IMPROVED ACCURACY

BACKGROUND

The present invention is related to the field of optical position encoders.

Optical position encoders operate based on patterns of light created by a scale that moves with respect to a light source. Movement of the scale results in corresponding changes in the light pattern, which can be detected and interpreted by optical and electronic components of the encoder to provide an indication of relative position between the scale and the light source.

Optical position encoders typically perform interpolation between adjacent marks or elements of a light pattern (also referred to as "fringes") in order to obtain higher precision measurements. For example, one class of optical encoders employs diffraction gratings to generate interference patterns having a substantially sinusoidal intensity profile in the direction of relative movement. By sampling the interference pattern at multiple intra-fringe locations and performing standard trigonometric functions on the samples, measurement precision of 14 to 16 bits can be achieved. However, the actual accuracy of such encoders is highly dependent upon the degree to which the light intensity profile is actually sinusoidal. The presence of undesired harmonic components in the intensity profile, for example, can cause significant intra-fringe inaccuracy, reducing the overall accuracy of the encoder.

One example of an optical position encoder employing the above principles employs a light source and a scale in the form of a diffraction grating, and further utilizes a "wavefront compensator" disposed between the light source and the scale. The wavefront compensator generates a plurality of light beams corresponding to different "diffraction orders". Ideally, a $0^{th}$ diffraction order is entirely suppressed when the wavefront compensator is of the type known as a "phase grating". The $+/-1^{st}$ diffraction orders are converged to a location on the scale from which a composite beam is generated that creates the interference pattern on an optical detector. If only the $+/-1^{st}$ diffraction orders are present, it can be shown mathematically that the intensity profile of the interference pattern is theoretically purely sinusoidal. In practice, however, some small amount of the $0^{th}$ order may also reach the scale, as may some of the higher orders such as the $+/-2^{nd}$ orders etc. All of these unwanted orders introduce distortion into the interference pattern and thus reduce overall encoder accuracy.

SUMMARY

In accordance with the present invention, an optical position encoder is disclosed that employs spatial filtering of diffraction orders other than $+/-1^{st}$ diffraction orders, such that high intra-fringe accuracy can be obtained at the detector and thus the overall accuracy of the detector is improved.

The disclosed optical position encoder includes a light source operative to generate a source light beam, a scale including a diffractive scale pattern extending in a direction of relative motion of the scale with respect to the light source, an optical detector adjacent to the scale, and first and second spaced-apart diffraction gratings between the light source and the scale, the first diffraction grating having a location at which the source light beam is incident. The diffraction gratings and scale are mutually configured and cooperative to spatially separate $+/-1st$ diffraction orders from other diffraction orders and to direct the $+/-1st$ diffraction orders as respective optical beams along respective optical paths. In particular, the optical paths diverge from the location of the first diffraction grating to respective locations of the second diffraction grating, the respective locations being separated by more than the beam width of the source light beam. The optical paths further converge from the respective locations on the second diffraction grating to an area of the scale adjacent to the optical detector, and then extend from the area of the scale to the optical detector to create an interference pattern at the optical detector as a function of the relative position between the scale and the light source.

The $0^{th}$ diffraction order may be suppressed in various ways, such as by use of an optical mask that permits passage of the $+/1$ first diffraction orders while blocking the $0^{th}$ orders. To suppress higher orders, the first diffraction grating can be designed to achieve total internal reflection of such higher orders, such that they are directed completely away from the second diffraction grating and the scale.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is a schematic side view of an optical position encoder like that of FIG. 1 employing a transmissive scale; and FIGS. 5 and 5a are schematic side views of an optical position encoder employing two closely spaced optical elements.

DETAILED DESCRIPTION

Figure 1:
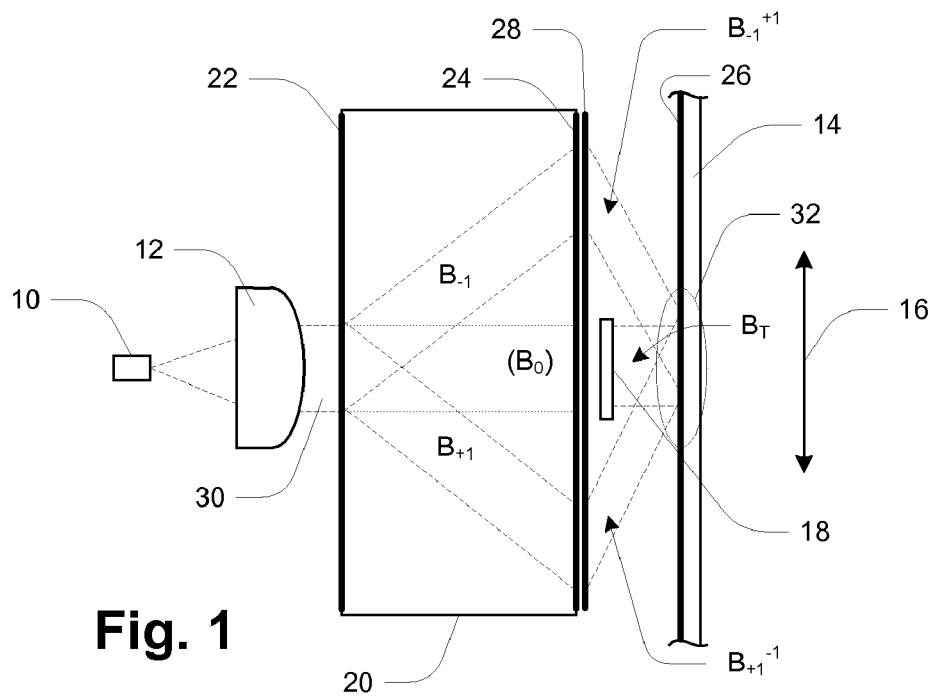
FIG. 1 is a schematic side view of an optical position encoder in accordance with the present invention.

FIG. 1 shows an interferometric linear optical encoder having a light source 10, a collimating lens 12, a scale 14 that moves in a direction relative to the light source 10 as indicated by line 16, an optical detector 18, and an optical element 20 disposed between the lens 12 and the scale 14. All the elements 10, 12, 18 and 20 are stationary with respect to each other, such as by use of a single substrate or other rigid mounting structure. The optical element 20 is formed of an optically transparent material (such as glass) with first and second diffraction gratings 22, 24 on respective surfaces, and the scale 14 likewise includes a diffraction grating 26. An optical mask 28 is located adjacent to the second diffraction grating 24. The diffraction gratings 22, 24 and 26 are preferably binary phase gratings such as gratings having a square-wave profile, for example, in order to suppress transmission of a $0^{th}$ diffraction order, although in alternative embodiments amplitude gratings may be employed. Although the encoder of FIG. 1 employs a reflective scale 14, in alternative embodiments a transmissive scale may be employed as described below.

In operation, the first diffraction grating 22 generates diffraction orders from an incident collimated beam 30 from the lens 12. The +/−1st diffraction orders are shown as beams $B_{+1}$ and $B_{-1}$ respectively. These beams diverge toward respective separate areas on the second diffraction grating 24 as shown. The $0^{th}$ diffraction order, if present, is shown as beam $B_0$. Diffraction orders higher than the +/−1sts orders are not shown, as they are preferably directed entirely away from the second grating 24 as discussed below.

The second diffraction grating 24 generates diffraction orders as a result of each incident beam $B_{+1}$ and $B_{-1}$. Respective +/−1st diffraction orders are shown as beams $B_{-1}^{+1}$ and $B_{+1}^{-1}$ respectively. These are directed through the optical mask 28 and converge at an area 32 of the scale 14. The diffraction grating 26 of the scale 14 generates reflected +/−1st diffraction orders from the beams $B_{-1}^{+1}$ and $B_{+1}^{-1}$, specifically diffraction orders that are reflected to the detector 18. These are indicated by the terminal beam $B_T$ which is a compound beam including both of the reflected orders. Due to interference between these reflected orders, the terminal beam $B_T$ creates at the detector 18 an optical interference pattern having a periodically spaced set of lines or fringes. The detector 18 may include an array of elements arranged linearly along the direction of relative motion 16.

As the scale 14 moves in the direction of line 16, the relative phase between the two reflected diffraction orders that constitute the beam $B_T$ changes in a periodic (ideally sinusoidal) manner, resulting in a position-dependent interference pattern incident on the detector 18. The detector 18 translates the interference pattern into a corresponding pattern of electrical signals, which are processed by separate electronic circuitry (not shown) to generate a precise electrical indication of the position of the scale 14.

The encoder of FIG. 1 performs spatial filtering of the diffraction orders generated by the gratings 22, 24 in order to limit the light reaching the detector 18 to +/−1st diffraction orders. By doing so, inaccuracies that arise due to the presence of other diffraction orders at the detector 18 are greatly reduced. In the illustrated embodiment, the spatial filtering is accomplished by the overall geometry as well as proper selection of the light wavelength and grating pitches, as described in more detail below. In particular, the phenomenon of total internal reflection (TIR) is exploited to help steer unwanted diffraction orders away from the scale 14 to maintain a sinusoidal characteristic of the optical interference pattern at the detector 18. Additionally, the optical mask 28 plays a role by blocking light except for selected areas where the $B_{+1}$ and $B_{-1}$ are incident on the second grating 24. Specifically, any light energy in the $0^{th}$ diffraction order (beam $B_0$) is blocked by the optical mask 28 and thus cannot reach the scale 14 and the detector 18.

Figure 2:
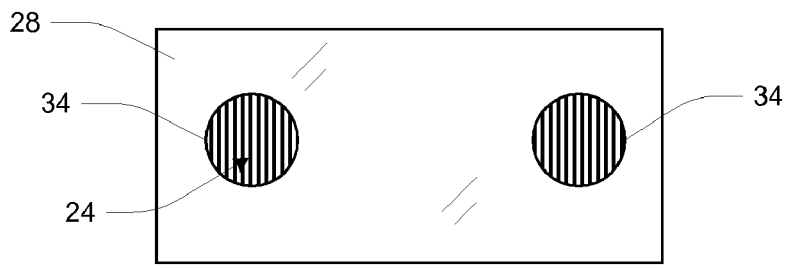
FIG. 2 is a front view of an optical mask in the optical position encoder of FIG. 1.

FIG. 2 shows the optical mask 28. It consists of an opaque planar material with two openings 34, which are located at the locations where the diffraction orders $B_{+1}$ and $B_{-1}$ are incident on the second grating 24. Portions of the diffraction grating 24 are shown behind the openings 34 in FIG. 2. The optical mask 28 may be a thin planar substrate, such as a metal substrate, adhered to the surface of the optical element 20. Alternatively, it may be applied to the surface of the optical element as an opaque coating, which may also be metal or may be some other material. It will be appreciated that the sizes of the openings 34 are selected to correspond to the desired beam widths of the $B_{-1}^{+1}$ and $B_{+1}^{-1}$ diffraction orders, and that the separation between the openings 34 is preferably at least as great as the beam width of the beam $B_0$ to provide the desired blocking effect.

Referring back to FIG. 1, it should be noted that the optical mask 28 may be dispensed with in alternative embodiments. When a reflective scale 14 is employed as in FIG. 1, the optical detector 18 can itself block the $0^{th}$ order beam $B_0$ from reaching the scale 14, if the detector 18 is made sufficiently large and positioned properly. With such a detector configuration, any additional blocking of the beam $B_0$ that would be provided by the optical mask 28 may not be worth the additional cost and complexity of including the optical mask 28 in the assembly, and thus it can be omitted.

Generally, it is desired to address the following overall goals in any particular embodiment of the disclosed optical encoder:

Maximize the diffraction efficiency of the +1 and −1 diffraction orders to maximize optical power at the detector 18 and thereby maximize signal-to-noise ratio Spatially filter all unwanted diffraction orders such that only the desired +1 and −1 orders from the scale 26 illuminate the detector 18 (high intra-fringe accuracy)

Minimize the size of the encoder (i.e. the distance from the light source 10 to the scale 14 (reflective) or detector 18 (transmissive)

Match the period of the interference pattern at the detector 18 to the size and spacing of discrete detector elements within the detector 18

Below are given some suggestions for selection of various encoder parameters. The following notation is utilized:

FP=optical fringe period (period of interference pattern at detector 18)
λ=wavelength of the light from source 10
n=index of refraction
d=grating pitch
θ=angle in degrees
m=diffraction order First, it is desired that the 0th order and all diffraction orders higher than +/−1 are spatially filtered or separated from the +/−$1^{st}$ orders. Spatial separation can be achieved by making the distance between the gratings 22 and 24 sufficiently large, as well as by making the pitch of the first grating 22 sufficiently fine (resulting in sharper diffraction angles). Generally, the latter approach is preferred in order to minimize the overall size of the encoder. However, the effect of sharper diffraction angles on diffraction efficiency (and thus signal strength and signal-to-noise ratio) should be taken into account in any practical implementation.

The basic grating equation is as follows:

$$n \text{ SIN } \theta + n_i \text{ SIN } \theta_i = m\lambda/d \quad (1)$$

where $n_i$ and $\theta_i$ are the incident index of refraction and angle respectively (i.e., index and angle of the optical element 20), and n and θ are the index of refraction and angle after the grating interface (angles measured with respect to normal to surface).

The angle $\theta_1$ for the diffraction orders +/−1 at grating 22 (i.e., beams $B_{-1}$ and $B_{+1}$) is given by the following expression, assuming that the incidence angle of incident beam 30 is 0° (i.e., $n_i$ SIN $\theta_i$=0):

$$\theta_1 = A \text{ SIN}(\lambda/nd_1) \quad (2)$$

The critical angle is the angle at which a beam will be subject to total internal reflection (TIR) at an interface of materials, such as a glass/air interface. The equation is:

$$\theta_c = A \text{ SIN}(1/n) \quad (3)$$

If possible, it is desired to set the grating pitch of the first grating 22 at least to the point where all orders higher than +/−1 are subject to TIR. This makes it easier to spatially filter all diffraction orders higher than 1. In general, the maximum grating pitch is given by the following relationship:

$$d_1 = 2\lambda/n \, \text{SIN}(\theta_c) = 2\lambda \quad (4)$$

It is preferred that the pitch of the first grating 22 be set such that the angles of diffraction orders +/−2 and higher exceed 90 degrees. In this case, all light will be in the +/−1 and 0 diffraction orders. The maximum grating pitch will be:

$$d_1 = 2\lambda/n \, \text{SIN}(90) = 2\lambda/n \quad (5)$$

As a second suggestion, the angle $\theta_3$ of both the +1 and −1 orders from the scale 14 is selected to produce a desired optical fringe period FP at the detector 18:

$$FP = \lambda/\text{SIN}(2\theta_3) \quad (6)$$

$$\theta_3 = (A \, \text{SIN}(\lambda/FP))/2 \quad (7)$$

The angles from the appropriate +1 and −1 orders from the second grating 24 are set so that the desired angle $\theta_3$ for the +1 and −1 orders from the scale 14 (per equation 7) is achieved:

$$\theta_3 = A \, \text{SIN}(-(\lambda/d_3)) + (\text{SIN } \theta_2)) = A \, \text{SIN}(-(\lambda/d_3) + ((\lambda/d_2) + (n \, \text{SIN } \theta_1))) = A \, \text{SIN}(-\lambda/d_3 + \lambda/d_2 - \lambda/d_1) \quad (8)$$

$$A \, \text{SIN}(-\lambda/d_3 + \lambda/d_2 - \lambda/d_1) = (A \, \text{SIN}(\lambda/FP))/2 \quad (9)$$

$$\lambda/d_2 - \lambda/d_1 - \lambda/d_3 = \text{SIN}((A \, \text{SIN}(\lambda/FP))/2) \quad (10)$$

Also, the respective pitches for the grating 24 and scale 14 are set so that all undesired orders are either eliminated or can be spatially filtered from the detector 18. This is done in a similar way as described above for grating 22. The preferred method is to eliminate as many undesired orders as possible using the grating pitch so as to increase the diffraction efficiency for the desired orders.

Finally a spatial filter such as the optical mask 28 may be placed between the grating 24 and the scale 28 in order to eliminate the 0th orders while allowing the desired +/−1 orders to pass.

According to one implementation, an overall configuration as follows may be employed:

$\lambda$=0.85 um
FP=40 um
n=1.52
$d_1$=1.6 um
$d_2$=0.792 um
$d_3$=1.6 um

The gratings 22, 24 can be separated by air or by an optically transmissive material, such as glass in the illustrated embodiment. In the illustrated arrangement, the gratings 22 and 24 are held in a fixed spatial relationship by being formed on opposite parallel surfaces a glass substrate. This arrangement has several benefits. The optical paths between the gratings 22 and 24 pass through a single uniform material rather than through multiple discrete elements that must be aligned etc. The gratings 22 and 24 can be precisely aligned in a precision manufacturing operation for the single optical element 20 (e.g., using photolithography etc.) and then it is only necessary to align the optical element 20 with the scale 14 and detector 18 in the overall assembly. Nonetheless, in alternative embodiments it may be desirable to employ alternative configurations, such as forming each grating 22 and 24 on a respective different substrate and then aligning these substrates during the overall assembly, such as described below.

Figure 3:
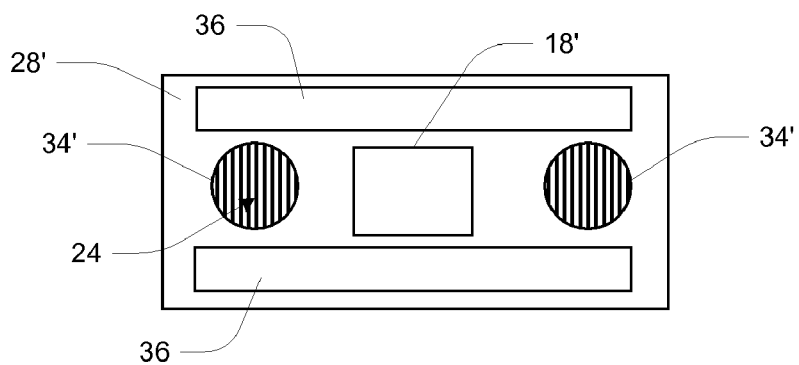
FIG. 3 is a front view of a printed circuit board (PCB) optical mask that may be used as an alternative to the optical mask of FIG. 2.

FIG. 3 illustrates an alternative in which the optical mask 28' is a printed circuit board (PCB) on which an optical detector 18' is mounted. The PCB optical mask 28' has openings 34' at the same locations as the openings 34 of optical mask 28. One benefit of the arrangement of FIG. 3 is that electronic circuitry for processing the outputs from the detector 18' can be located immediately adjacent to the detector 18' in respective areas 36 of the PCB optical mask 28'.

FIG. 4 illustrates an alternative that employs a transmissive scale 14' rather than the reflective scale 14 of FIG. 1. Otherwise the arrangement may be very similar. In such a transmissive embodiment, the detector 18 is not used to block the beam $B_0$ from reaching the scale 14', and thus it may be desirable to employ an optical mask 28 or similar blocking member for this purpose.

FIG. 5 illustrates an alternative employing a pair of optical elements 38-1 and 38-2 instead of a single optical element such as optical element 20 of FIG. 1. The close-up view of FIG. 5a illustrates the zigzag path traveled by the beam $B_{-1}$ due to refraction at the surfaces of the elements 38-1, 38-2 (a similar effect occurs for beam $B_{+1}$). This effect must be taken into account in configuring and aligning the overall assembly such that the beams $B_{+1}$ and $B_{-1}$ arrive at the desired locations on the second grating 24.

While this invention has been particularly shown and described with references to preferred embodiments thereof, it will be understood by those skilled in the art that various changes in form and details may be made therein without departing from the spirit and scope of the invention as defined by the appended claims. For example, it may be desirable to employ light sources capable of generating light of shorter wavelength, such as 365-nm. diode lasers. By using shorter-wavelength light, the distances d1 to d3 can be reduced, resulting in a smaller overall package, while achieving greater accuracy and resolution. Generally, it is desired to choose the respective pitches of the gratings 22, 24 and 26 in terms of wavelength such that there is no energy in any orders higher than the +/−1$^{st}$ orders.

What is claimed is:

1. An optical position encoder, comprising:
   a light source operative to generate a source light beam having a beam width;
   a scale including a diffractive scale pattern extending in a direction of relative motion of the scale with respect to the light source;
   an optical detector adjacent to the scale; and
   first and second spaced-apart diffraction gratings between the light source and the scale, the first diffraction grating having a location at which the source light beam is incident;
   wherein the diffraction gratings and scale are mutually configured and cooperative to spatially separate +/− 1st diffraction orders from other diffraction orders and to direct the +/− 1st diffraction orders as respective optical beams along respective optical paths, the optical paths (i) diverging from the location of the first diffraction grating to respective locations of the second diffraction grating, the respective locations being separated by more than the beam width, (ii) converging from the respective locations on the second diffraction grating to an area of the scale adjacent to the optical detector, and (iii) extending from the area of the scale to the optical detector to create an interference pattern at the optical detector as a function of the relative position between the scale and the light source.

2. An optical position encoder according to claim 1, wherein the scale is reflective and the optical detector is disposed between the second diffraction grating and the scale.

3. An optical position encoder according to claim 2, wherein the detector is configured to block substantially all of a $0^{th}$ order optical beam from the second diffraction grating thereby preventing the $0^{th}$ order optical beam from reaching the area of the scale.

4. An optical position encoder according to claim 1, wherein the scale is transmissive and the optical detector is disposed on the opposite side of the scale from the second diffraction grating.

5. An optical position encoder according to claim 4, further comprising an optical mask disposed between the second diffraction grating and the scale, the optical mask being configured to block substantially all of a $0^{th}$ order beam from the second diffraction grating thereby preventing the $0^{th}$ order optical beam from reaching the area of the scale.

6. An optical position encoder according to claim 1, wherein the first and second diffraction gratings are formed on parallel opposite faces of a unitary, optically transmissive substrate.

7. An optical position encoder according to claim 6, wherein the unitary, optically transmissive substrate is a glass substrate.

8. An optical position encoder according to claim 1, wherein the first and second diffraction gratings are formed on separate optically transmissive substrates.

9. An optical position encoder according to claim 1, further comprising an optical mask adjacent to the second diffraction grating, the optical mask having two optical apertures adjacent to the respective locations of the second diffraction grating and an opaque region between the two optical apertures, the optical apertures being operative to pass substantially all the light energy traveling along the optical paths and the opaque regions being operative to block substantially all the light energy of a $0^{th}$ order optical beam from the second diffraction grating.

10. An optical position encoder according to claim 9, wherein the optical mask comprises an opaque coating over the second diffraction grating.

11. An optical position encoder according to claim 10, wherein the opaque coating comprises a metal coating.

12. An optical position encoder according to claim 9, wherein the optical mask comprises a printed circuit board.

13. An optical position encoder according to claim 12, wherein the detector is mounted to the printed circuit board.

14. An optical position encoder according to claim 1, wherein the first and second diffraction gratings are phase gratings.

15. An optical position encoder according to claim 1, wherein the first and second diffraction gratings are amplitude gratings.

16. An optical position encoder according to claim 1, wherein the first grating is configured to impart total internal reflection to all diffraction orders higher than the +/- 1st orders.

17. An optical position encoder according to claim 1, wherein the optical detector and the first and second spaced-apart diffraction gratings are stationary with respect to the light source.

18. An optical position encoder according to claim 1, wherein the scale is configured to move in a direction perpendicular to the direction of light emitted from the light source.

* * * * *